Patented Dec. 26, 1939

2,185,154

UNITED STATES PATENT OFFICE 2,185,154

DIAZO DERIVATIVES OF GUANIDYL ACIDS

Hans Z. Lecher, Plainfield, Frederic H. Adams, Somerville, and Henry Philip Orem, North Plainfield, N. J., assignors, by mesne assignments, to American Cyanamid Company, New York, N. Y., a corporation of Maine No Drawing. Application August 9, 1939, Serial No. 289,181

11 Claims. (Cl. 260—140)

This invention relates to stabilized diazo compounds in which a guanidyl carboxylic acid or a guanidyl sulfonic acid free from azoic coupling groups is chemically combined with a diazotized amine corresponding to the formula:

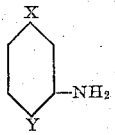

in which X and Y stand for alkyl, alkoxy, aryloxy, halogen, the nitro group or the group $CF_3$ and which may be further substituted, provided that the further substituents are not solubilizing groups.

According to the present invention, the diazotized amines are condensed with guanidyl sulfonic or carboxylic acids or their alkali metal or ammonium salts in which the guanidyl group has at least one reactive hydrogen attached to a nitrogen atom and capable of reacting with a diazotized amine. The products obtained are of high stability and will not couple with ice color coupling components in alkaline media although they may be split by acid into their original components. The products are thus useful in the printing of ice colors as they permit mixing with a coupling component in a stable alkaline printing paste without producing color and the print can then be developed by treatment with weak acid or acid vapors in the usual manner.

The new stabilized diazo compounds of the present invention correspond most probably to the following general formula:

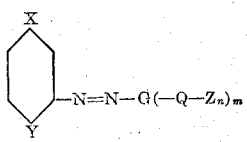

where X and Y stand for halogen, alkyl, alkoxy, aryloxy, the nitro group and the group $CF_3$, G stands for a guanidine radical free from substituents capable of azoic coupling, Q is an aliphatic, aromatic-aliphatic, aromatic, alicyclic or heterocyclic radical incapable of azoic coupling, Z is the carboxylic or sulfonic radical or their alkali metal or ammonium salts, $n$ is 1, 2 or 3 and $m$ is 1 or 2.

It is not certain just where the azo group connects with the guanidine radical and the present invention is not limited to any particular theory of the formula of the compound. The following typical formula is believed to be the most probable one, but it is possible that the azo group or the C=N double bond may be shifted to another nitrogen atom because of tautomerism:

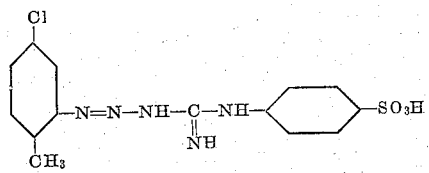

The present invention is not limited to the use of any particular guanidyl carboxylic acid or guanidyl sulfonic acid. On the contrary, it is generally applicable to any such compounds as long as they contain a reactive hydrogen atom attached to a nitrogen atom and are capable of reacting with diazotized amines of the types referred to. Simple unsubstituted guanidyl carboxylic and sulfonic acids may be used such as, e. g., guanidyl acetic acid (guanyl glycine, glycocyamine), alpha guanidyl propionic acid (guanyl alanine), p-guanidyl benzoic acid, guanidyl ethane sulfonic acid (guanyl taurine); guanidyl propane sulfonic acids such as alpha guanidyl propane beta sulfonic acid, 2-guanidyl-2-methyl propane sulfonic acid, guanidyl cyclohexane sulfonic acids, sulfo-benzyl guanidines; guanidyl benzene sulfonic acids such as guanyl sulfanilic acid or guanyl metanilic acid or guanyl orthanilic acid; guanidyl naphthalene sulfonic acids such as guanyl naphthionic acid or guanyl Tobias acid. Heterocyclic guanidyl acids such as guanyl proline or guanidyl pyridine carboxylic acids are useful, as are disulfonic acids such as guanyl amino diethane disulfonic acid having the following formula:

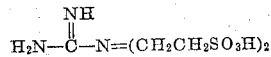

or 2-guanidyl-2-methyl propane-1,3-disulfonic acid; trisulfonic acids such as guanidyl-tri-(sulfomethyl)-methane; dicarboxylic acids such as guanyl glutamic acid and guanidyl acids having both the sulfonic and carboxylic groups such as guanidyl sulfobenzoic acids.

The guanidyl group itself may be substituted as pointed out above, creatine, for example, being a very useful stabilizer. The radical substituting the guanidyl group or connecting the guanidyl groups with the acidic groups may be further substituted provided that the substituent does not make the radical capable of azoic coupling as hydroxyl or amino groups would do with an aromatic radical; thus, 2-chloro-5- guanidyl toluene-4-sulfonic acid may be used as stabilizer.

Typical amines from which stabilized diazo compounds of the present invention may be prepared are, e. g., the following ones: 2,5-difluoroaniline, 2,5-dichloroaniline, 2-fluoro-5-chloroaniline, 3-amino-4-chloro benzo trifluoride; 2-methyl-5-chloroaniline, 5-methyl-2-chloroaniline; 2-methyl-5-nitroaniline; 2-methoxy-5-methyl aniline, 2-methyl-5-methoxyaniline, 2,5-methoxy-5-chloroaniline, 2-methoxy-5-bromoaniline, 4-chloro-2-amino-diphenyl ether, 4-amino-2-chloro diphenyl ether, 2-methoxy-5-nitroaniline.

The condensation of the diazotized amines with the guanidyl carboxylic or sulfonic acids is carried out in alkaline medium. The optimum pH, however, will vary to some extent with the particular diazo component and with the particular guanidine derivatives used. In general, there will be an optimum pH or pH range for each pair of reaction components. In many cases, an excess of the guanidine compounds is of advantage and it is possible to use such an excess without reagent waste as this excess may be recovered in most of the cases if desired.

The concentration and the temperature at which the reaction is advantageously carried out will, of course, vary with the reaction component used. However, in general, it is advisable to maintain a low temperature and a low concentration.

Since the stabilized diazo compounds of the present invention contain a solubilizing sulfonic group or carboxylic group, they are soluble in aqueous alkali or in aqueous solutions of ammonia, of amines or of quaternary ammonium bases. While in the case of alkali and of the strong quaternary ammonium bases such as tetramethyl ammonium hydroxide only an equivalent amount, or a slight excess, of the base is required to promote solution, in the case of the weaker bases, such as ammonia and the various amines, a larger excess is required.

The isolation of the stabilized diazo compounds of this invention may be effected by salting out or by internal salt formation through the addition of acids. The method of salting out in alkaline medium is generally preferable as the compounds are not very stable to acids and even the use of weak acids may cause some decomposition.

The compounds are, for the most part, yellow in color. They are very stable even at elevated temperatures and not explosive which is important as many diazo compounds present considerable explosion hazard. The ready solubility of the compounds of the present invention in solutions of bases quoted above, and the stability against hydrolysis in alkaline solution is another important property and constitutes one advantage of the present invention.

The products of the present invention are split by acid in aqueous solution and regenerate the component parts of the molecules. The ease with which the compounds are split by acid will, of course, differ with different compounds, but in most cases heating with acetic acid is sufficient to effect splitting. From the practical point of view, it is important that in this manner an ice color component can be converted into a very stable diazo compound from which, however, the diazotized amine may be easily regenerated by the aid of acids.

Because of these desirable properties the stable diazo compounds of the present invention can be used mixed with ice color coupling components in alkaline printing pastes. Prints can be developed with steam containing vapors of weak acids such as formic or acetic acids. When the diazo compounds of the present invention are used in the form of salts with weak and volatile amines or are dissolved by the aid of weak and volatile amines such as, e. g., diethyl ethanolamine, the development of the color may be accomplished by steam only without any additional acid because the steam removes the amine and decreases the alkalinity of the printing paste. The same is true if there is added to the printing paste a potential acidic substance which will produce an acid on steaming, such as, e. g., sodium monochloroacetate, the monoacetyl ester of glycerine, ethylene monochlorohydrin, formamide, etc. Furthermore, in making up the printing paste, if insufficient amounts of base are used and some of the stabilized diazo compound and the coupling component remains undissolved, the prints may be developed with steam alone, without any addition of acid or of a potential acidic substance.

The invention will be described in conjunction with the following specific examples which are merely illustrative and are not intended to limit the scope of the invention. The parts are by weight.

*Example 1*

3.93 parts of 2-methyl-5-chloroaniline hydrochloride are mixed with 8.7 parts of 5N hydrochloric acid and 40 parts of water, iced to 5° C., and diazotized by the addition of 21 parts of normal sodium nitrite solution. The diazo solution so prepared is run into a solution of 4.5 parts of guanyl sulfanilic acid

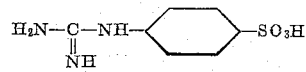

in 200 parts of water, 8.7 parts of 5N sodium hydroxide and 44 parts of 0.5N sodium carbonate. A yellow precipitation occurs during the reaction. After a half hour the reaction is complete as indicated by a negative test for free diazo. 100 parts of salt are added and the yellow precipitate is filtered and dried at room temperature.

4.66 parts of this product (containing 88.5% real stabilized diazo compound) are intimately mixed with 2.77 parts of 2-hydroxynaphthalene-3-carboxylic acid ortho-toluidide and 0.15 part of the sodium salt of sulfosuccinic acid diamyl ester and a little 2-ethylhexanol. 5 parts of this mixture are pasted with 5 parts of ethylene glycol-monoethyl ether, and 2.5 parts of 30° Bé. sodium hydroxide solution. 17.6 parts of warm water are added to the mixture and this is thickened by the addition of 70 parts of gum starch tragacanth solution. This printing paste is printed on cotton from a copper roll, the print is dried, aged by steam in the presence of acetic acid vapors, rinsed, soaped at elevated temperatures, rinsed again and dried. A bright red print of good strength is obtained.

*Example 2*

3.2 parts of 2-methoxy-5-chloroaniline, 17 parts of water and 8.7 parts of 5N hydrochloric acid are cooled to 3° C. and diazotized with 1.4 parts of sodium nitrite.

3.3 parts of creatine are added to 14.6 parts of 5N NaOH, and the diazo solution as prepared is added slowly at 5° C. 1.2 parts of glacial acetic acid are then added and the solution stirred until reaction is complete. 4.7 parts of 5N NaOH and 100 parts of water are added, the solution is heated to 50° C. and filtered. 28 parts of potassium chloride are added for each 100 parts of solution and the solution is cooled to 15° C. The precipitate is filtered off and dried.

3 parts of the product (containing 93% real stabilized diazo compound) are blended with 1.7 parts of bis-acetoacetyl-benzidide, converted into a printing paste as in Example 1, and printed on cotton from a copper roll, dried, aged by steam in the presence of acetic acid vapors, rinsed, soaped at elevated temperatures, rinsed and dried. A sharp yellow print of very good strength and fastness properties is obtained.

Example 3

3.56 parts of 2-methyl-5-chloroaniline hydrochloride are mixed with 8.65 parts of 5N hydrochloric acid and 40 parts of water. The mixture is iced to 5° C. and the base is diazotized by the gradual addition of a solution containing 1.4 parts of sodium nitrite.

The diazo solution thus prepared is run into a solution of 5.5 parts of guanyl Tobias acid (guanyl-2-naphthylamine-1-sulfonic acid)

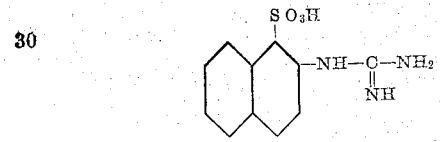

in 9.5 parts of 5N sodium hydroxide, 43.5 parts of 0.5N sodium carbonate and 200 parts of water. A yellow precipitate forms and this is filtered off at the end of a half hour. It is washed with a little water and is dried at room temperature. The product is an orange-brown powder, slightly soluble in dilute caustic. When heated with beta naphthol and acetic acid solution, a red dye is produced.

Example 4

8.9 parts of 2-methyl-5-chloroaniline hydrochloride are slurried with 100 parts of water and 21 parts of 5N hydrochloric acid. The solution is cooled to 3° C. and 51.5 parts of normal sodium nitrite solution are added slowly with stirring until diazotization is complete. 7.9 parts of creatine are added to the solution and 37.8 parts of 5N sodium hydroxide are added slowly with stirring. Then 7.2 parts of 20% acetic acid are added and the solution stirred until all active diazo has disappeared. The solution is filtered and 40 parts of sodium chloride are added. It is carefully acidified with hydrochloric acid to an acid test to Congo Red paper. The crystalline product is filtered off and dried.

3.9 parts of this product (containing 76% real stabilized diazo compound) are intimately mixed with 2.9 parts of 2-hydroxynaphthalene-3-carboxylic acid o-toluidide. 5 parts of this mixture are pasted with 5 parts of ethylene glycol monoethyl ether and 2.5 parts of 30° Bé. sodium hydroxide solution. 17.5 parts of water are added to the mixture and this is thickened by the addition of 70 parts of neutral gum starch tragacanth solution. This printing paste is printed on cotton from a copper roll, dried, aged by steam in the presence of acetic acid vapors, rinsed, soaped at elevated temperature, rinsed and dried. A sharp red print of very good fastness properties is obtained.

Example 5

3.9 parts of 2-methyl-5-chloroaniline hydrochloride are stirred in a mixture of 30 parts of water and of 8.7 parts of 5N hydrochloric acid at 3° C. It is diazotized by adding 1.4 parts of sodium nitrite. After diazotization is complete, 3.3 parts of creatine are added to the solution, then 5.2 parts of sodium bicarbonate, followed by the addition of 8.7 parts of 5N sodium hydroxide. After ½ hour, 4.6 parts of 5N sodium hydroxide are added to a positive test to phenolphthalein.

After the reaction is complete, 15 parts of salt are added for each 100 parts of solution and the crystalline product filtered off and dried.

3.5 parts of the material (containing 75% real stabilized diazo compound) are blended with 1.5 parts of bis-acetoacetyl-benzidide and 0.2 part of urea and the blend converted into a printing paste which is printed on cotton in a manner similar to that used in Example 4. The print is golden yellow of very good fastness properties.

Isolation of the stabilized diazo compound from the above reaction solution is also accomplished by addition of 70 parts of potassium carbonate for each 100 parts of the reacted solution.

2.9 parts of this material are blended with 1.6 parts of 2-hydroxynaphthalene-3-carboxylic acid o-phenetidide. When the blend is converted to a print paste and printed as in Example 4, a bright scarlet print is obtained.

Example 6

A diazo solution is prepared as in Example 5 from 3.9 parts of 2-methyl-5-chloroaniline hydrochloride and this is reacted with 5.2 parts of guanyl glycine

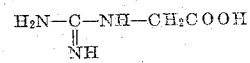

in the presence of 3 parts of sodium acetate and 59 parts of 5N sodium hydroxide which is added in two portions, allowing one hour to elapse before the addition of the second portion. After reaction is complete, the product is heated to 70° C., filtered, and the residue extracted with a second portion of water at 70° C.

22 parts of salt are added for each 100 parts of solution, the solution is cooled to 15° C., filtered, and the product is dried.

3.8 parts of the product (containing 77% real stabilized diazo compound) blended with bis-acetoacetyl-o-tolidide, converted to a printing paste and printed as in Example 4 give a bright yellow print of good fastness properties.

Example 7

9.6 parts of 2-methyl-5-chloroaniline hydrochloride are slurried in 106 parts of water and 5 parts of 38% hydrochloric acid. The mixture is cooled and diazotized with 3.5 parts of sodium nitrite. Then 11 parts of guanyl orthanilic acid (prepared from o-aminobenzene sulfonic acid and cyanamide) are added to the solution which is made alkaline by the aid of potassium hydroxide solution. The reaction starts immediately and is complete in about one hour. The material is salted out by the aid of potassium carbonate, filtered and dried.

This product blended with an equivalent quantity of 2-hydroxy-3-naphthoic acid o-toluidide and made up into a printing paste in the customary manner, printed and acid aged, gives a very good red print.

Instead of guanyl orthanilic acid, guanyl metanilic acid (prepared from m-aminobenzene sulfonic acid and cyanamide in the presence of ammonia) may be used for the stabilization of diazotized 2-methyl-5-chloroaniline, the procedure being essentially the same. A printing paste containing this product and the o-anisidide of 2-hydroxy-3-naphthoic acid as coupling component gives a very good scarlet print.

*Example 8*

3.15 parts of 2-methoxy-5-chloroaniline are dissolved in a mixture of 13 parts of 16.86% hydrochloric acid and 40 parts of water by heating. The solution is cooled and diazotized by the addition of 20 parts 6.9% sodium nitrite solution. The diazo solution is filtered and added to a stirred solution containing 4.5 parts guanyl sulfanilic acid, 1.6 parts sodium hydroxide, 4.24 parts sodium carbonate and 248 parts of water at 25°–30° C. After half an hour's stirring, 0.2 part of sodium hydroxide is added in the form of a solution and 10 minutes later the diazo test with R salt disappears. The resulting solution is cooled and the stabilized diazo compound is salted out by the aid of potassium carbonate. The yellow product is filtered off and dried.

This product is blended with an equivalent amount of the o-anisidide of 2-hydroxy-3-naphthoic acid. 5 parts of this blend are made up into a printing paste with 5 parts ethylene glycol monoethyl ether, 2.5 parts caustic soda solution 30° Bé., 17.5 parts water and 70 parts starch tragacanth gum. If printed on cotton cloth and aged by steam containing acetic acid vapors, a very good bluish red print is obtained.

Instead of isolating the stabilized diazo compounds in the solid state by filtration as described in the foregoing examples, it is also possible to extract them with organic solvents such as acetone which is particularly advantageous when ice color producing solutions containing the stabilized diazo compound and the naphthol are prepared.

What we claim is:

1. Stabilized diazo compounds having the following general formula:

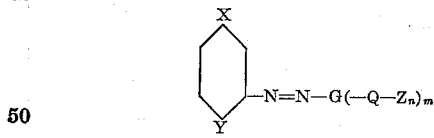

in which X and Y are radicals included in the group consisting of alkyl, alkoxy, aryloxy, nitro, halogen and $CF_3$ radicals, G is a guanidyl radical free from substituents capable of azoic coupling, Q is a radical incapable of azoic coupling and included in the group consisting of aromatic, aromatic-aliphatic, aliphatic and alicyclic radicals, Z is a member of the group consisting of carboxylic acid radicals, sulfonic acid radicals and their alkali metal and ammonium salts, and $n$ is a whole number included in the group consisting of 1, 2 and 3 and $m$ is a whole number included in the group consisting of 1 and 2.

2. Stabilized diazo compounds having the following general formula:

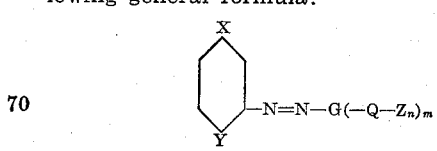

in which X and Y are radicals included in the group consisting of alkyl, alkoxy, aryloxy, nitro, halogen and $CF_3$ radicals, G is a guanidyl radical free from substituents capable of azoic coupling, Q is a radical incapable of azoic coupling and included in the group consisting of aromatic, aromatic-aliphatic, aliphatic and alicyclic radicals, Z is a member of the group consisting of carboxylic acid radicals and their alkali metal and ammonium salts, $n$ is a whole number included in the group consisting of 1, 2 and 3 and $m$ is a whole number included in the group consisting of 1 and 2.

3. Stabilized diazo compounds having the following general formula:

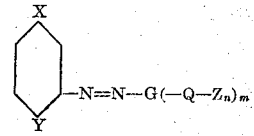

in which X and Y are radicals included in the group consisting of alkyl, alkoxy, aryloxy, nitro, halogen and $CF_3$ radicals, G is a guanidyl radical free from substituents capable of azoic coupling, Q is a radical incapable of azoic coupling and included in the group consisting of aromatic, aromatic-aliphatic, aliphatic and alicyclic radicals, Z is a member of the group consisting of sulfonic acid radicals and their alkali metal and ammonium salts, $n$ is a whole number included in the group consisting of 1, 2 and 3 and $m$ is a whole number included in the group consisting of 1 and 2.

4. Stabilized diazo compounds having the following formula:

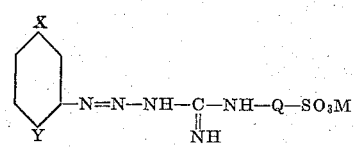

in which X and Y are radicals included in the group consisting of alkyl, alkoxy, aryloxy, nitro, halogen and $CF_3$ radicals, Q is a radical incapable of azoic coupling and included in the group consisting of aromatic, aromatic-aliphatic, aliphatic and alicyclic radicals, and M is a member of the group consisting of hydrogen, alkali metals and ammonium radicals.

5. Stabilized diazo compounds having the following formula:

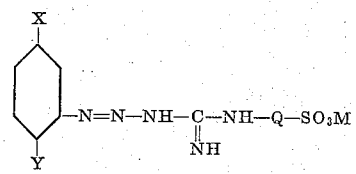

in which X and Y are radicals included in the group consisting of alkyl, alkoxy, aryloxy, nitro, halogen and $CF_3$ radicals, Q is an aromatic radical incapable of azoic coupling, and M is a member of the group consisting of hydrogen, alkali metals and ammonium radicals.

6. Stabilized diazo compounds having the following formula:

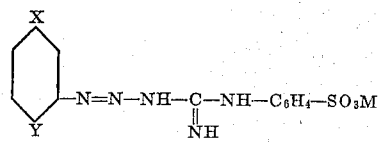

in which X and Y are radicals included in the group consisting of alkyl, alkoxy, aryloxy, nitro, halogen and $CF_3$ radicals, and M is a member of the group consisting of hydrogen, alkali metals and ammonium radicals.

7. Stabilized diazo compounds having the following formula:

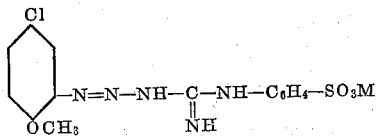

in which M is a member of the group consisting of hydrogen, alkali metals and ammonium radicals.

8. Stabilized diazo compounds having the following formula:

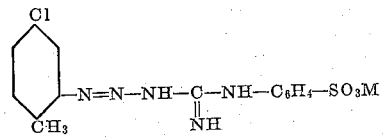

in which M is a member of the group consisting of hydrogen, alkali metals and ammonium radicals.

9. Stabilized diazo compounds having the following formula:

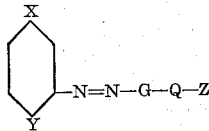

in which X and Y are radicals included in the group consisting of alkyl, alkoxy, aryloxy, nitro, halogen and $CF_3$ radicals, G is a guanidyl radical free from substituents capable of azoic coupling, Q is a radical incapable of azoic coupling and included in the group consisting of aromatic, aromatic-aliphatic, aliphatic and alicyclic radicals and Z is a member of the group consisting of a carboxylic acid radical and its alkali metal and ammonium salts.

10. Stabilized diazo compounds having the following formula:

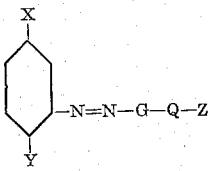

in which X and Y are radicals included in the group consisting of alkyl, alkoxy, aryloxy, nitro, halogen and $CF_3$ radicals, G is a guanidyl radical free from substituents capable of azoic coupling, Q is an aliphatic radical incapable of azoic coupling and Z is a member of the group consisting of a carboxylic acid radical and its alkali metal and ammonium salts.

11. Stabilized diazo compounds having the following formula:

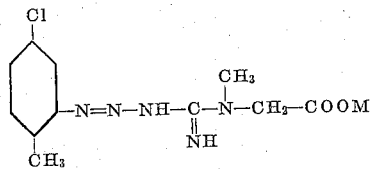

in which M is a member of the group consisting of hydrogen, alkali metal and ammonium radicals.

HANS Z. LECHER.
FREDERIC H. ADAMS.
HENRY PHILIP OREM.

DISCLAIMER 2,185,154.—*Hans Z. Lecher*, Plainfield, *Frederic H. Adams*, Somerville, and *Henry Philip Orem*, North Plainfield, N. J. DIAZO DERIVATIVES OF GUANIDYL ACIDS. Patent dated December 26, 1939. Disclaimer filed June 17, 1942, by the assignee, *American Cyanamid Company*.

Hereby disclaims claims 1, 2, 5, 6, 7, 8, 9, and 10.

[*Official Gazette July 21, 1942.*]